US011753298B2

(12) United States Patent
Basin et al.

(10) Patent No.: US 11,753,298 B2
(45) Date of Patent: Sep. 12, 2023

(54) PROCESS FOR PRODUCING HYDROGEN BY STEAM REFORMING AND CONVERSION OF CO

(71) Applicant: L'Air Liquide, Societe Anonyme pour l'Etude et l'Exploitation des Procedes Georges Claude, Paris (FR)

(72) Inventors: Marie Basin, Paris (FR); Daniel Gary, Paris (FR); Jean-Philippe Tadiello, Frankfurt am Main (DE)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 722 days.

(21) Appl. No.: 16/695,844

(22) Filed: Nov. 26, 2019

(65) Prior Publication Data

US 2020/0165128 A1 May 28, 2020

(30) Foreign Application Priority Data

Nov. 27, 2018 (FR) ...................................... 1871927

(51) Int. Cl.
*C01B 3/48* (2006.01)
*B01J 8/04* (2006.01)

(52) U.S. Cl.
CPC ............... *C01B 3/48* (2013.01); *B01J 8/0496* (2013.01); *C01B 2203/0233* (2013.01);
(Continued)

(58) Field of Classification Search
CPC .................... B01J 8/0496; C01B 3/48
See application file for complete search history.

(56) References Cited

U.S. PATENT DOCUMENTS 6,086,840 A * 7/2000 Whitney .................. C01B 3/56
423/655
7,981,271 B2 7/2011 Filippi et al.
(Continued)

FOREIGN PATENT DOCUMENTS

EP 0 578 218 1/1994
EP 0 985 635 3/2000
WO WO 2002/02220 1/2002

OTHER PUBLICATIONS

Boll, et al., "Gas Production, 3. Gas Treating, 2. Carbon Monoxide Shift Conversion," in: "Ullmann's Encyclopedia of Industrial Chemistry," Oct. 15, 2011.
(Continued)

*Primary Examiner* — Paul A Wartalowicz
(74) *Attorney, Agent, or Firm* — Justin K. Murray

(57) ABSTRACT

The invention relates to a process for producing hydrogen from a light hydrocarbon source, in which a synthesis gas is generated by steam methane reforming after desulfurization and optionally pre-reforming of the feedstock. The synthesis gas is enriched with hydrogen by steam conversion of carbon monoxide, and is subsequently purified in a pressure swing adsorption unit to give a pure $H_2$ product and a residual gas mixture containing $CH_4$, CO, $H_2$ and $CO_2$; in accordance with the invention, the conversion step is performed in a cooled reactor in which the heat of the conversion reaction is transferred to a fluid which feeds the burners of the reformer, or to the gas for reforming.

12 Claims, 2 Drawing Sheets

(52) U.S. Cl.
CPC ............ *C01B 2203/0283* (2013.01); *C01B 2203/0811* (2013.01); *C01B 2203/1614* (2013.01); *C01B 2203/82* (2013.01)

(56) References Cited

U.S. PATENT DOCUMENTS

| | | |
|---|---|---|
| 2010/0176346 A1 | 7/2010 | Musich et al. |
| 2016/0332876 A1 | 11/2016 | Xu et al. |
| 2017/0021322 A1 | 1/2017 | Wix et al. |

OTHER PUBLICATIONS

French Search Report and Written Opinion for FR 1 871 927, dated Aug. 6, 2019.

\* cited by examiner

PROCESS FOR PRODUCING HYDROGEN BY STEAM REFORMING AND CONVERSION OF CO

CROSS REFERENCE TO RELATED APPLICATIONS

This application claims the benefit of priority under 35 U.S.C. § 119 (a) and (b) to French patent application No. FR1871927, filed Nov. 27, 2018, the entire contents of which are incorporated herein by reference.

FIELD OF THE INVENTION

The present invention relates to a process for producing hydrogen from a light hydrocarbon source, in which a synthesis gas is generated by steam methane reforming, comprising a step of desulfurizing the hydrocarbons for reforming, followed by an optional pre-reforming step, a step of steam-reforming the desulfurized and pre-reformed hydrocarbons, the hydrogen being produced from the synthesis gas by hydrogen enrichment of the synthesis gas by conversion of carbon monoxide and purification in a pressure swing adsorption unit to give a pure $H_2$ product and a residual gas mixture containing $CH_4$, CO, $H_2$ and $CO_2$.

BACKGROUND OF THE INVENTION

Synthesis gas (also called syngas) is currently still produced predominantly by steam reforming of methane (steam methane reforming). The feedstock for the reformer is composed of light gaseous hydrocarbons (with gaseous referring to gaseous or vaporized liquid hydrocarbons); it usually comprises natural gas, methane, propane, butane, naphtha, and also light hydrocarbons obtained from certain refinery residuals, which are used alone or in combination; in the context of the invention, the expression "light hydrocarbons" will therefore include the refinery residuals employed as a source for the reforming. The feedstock will generally be pre-treated, i.e. desulfurized and if necessary pre-reformed, in order to convert the heavier hydrocarbons into methane before the steam reforming step itself. At the end of the reforming, a synthesis gas is obtained in which the two principal constituents are hydrogen and carbon monoxide but which also includes carbon dioxide, excess steam, residual methane and impurities. A small part of the hydrocarbons making up the feedstock is often used as a primary fuel for the reforming; accordingly, the process feed gas is differentiated from the fuel gas.

For simplification, and bearing in mind that the most commonly used source of light gaseous hydrocarbons is natural gas (or NG), reference will be made to natural gas rather than to hydrocarbons; in the remainder of the text, therefore, the process natural gas (also called process NG) is differentiated from the fuel natural gas (also called fuel NG), on the understanding that this description applies in the same way to the other light hydrocarbons mentioned above.

Depending on the composition of the natural gas, the reforming process comprises the following steps 1 to 3:
  a hot desulfurizing step 1, during which, after preheating of the process natural gas to 300-400° C., all the sulfur compounds present in the natural gas are converted into $H_2S$ by a catalytic process in a hydrogenation reactor, the $H_2S$ produced being subsequently captured on a bed of adsorbent;
  an optional pre-reforming step 2, during which the hydrocarbons heavier than methane enter at a temperature of 450-550° C. in an adiabatic reactor, in which they are converted, under the action of steam which is present, and in the presence of a pre-reforming catalyst, into a mixture composed of $CH_4$, $H_2$, CO and $CO_2$;
  a reforming step 3, which involves reacting the methane ($CH_4$) with the steam contained in the feedstock at high temperature, of the order of 850-950° C., in the presence of a reforming catalyst, the reaction taking place in tubular reactors which are installed in the furnace of a steam reformer, to give $H_2$, CO and $CO_2$, the main constituents of synthesis gas.

The subsequent steps are steps of treating the synthesis gas, during which it undergoes changes in composition until the desired end product is obtained.

Accordingly, the process for treating synthesis gas for producing hydrogen will comprise some or all of the following steps 4 to 6:
  a step 4 of converting (also called shift or water-gas shift reaction) the carbon monoxide present in the syngas and steam into a mixture of hydrogen and carbon dioxide; this conversion is performed in the presence of a shift catalyst in an adiabatic reactor having an entry temperature of between 200° C. and 360° C. depending on the catalyst; this step is carried out when required by the composition of the desired synthesis gas, in particular when the main end product required is hydrogen;
  a cooling/condensation step 5, during which the synthesis gas enriched with $H_2$ and $CO_2$ is cooled in a number of successive exchangers, and excess water is condensed and separated from this gas;
  a step 6 of purifying the synthesis gas in a pressure swing adsorption (PSA) unit to give hydrogen at a purity of more than 99.99%, referred to as pure hydrogen, and a residual gas mixture containing $CH_4$, CO, $H_2$ and $CO_2$, also referred to simply as "PSA residuals"; note that these PSA residuals have a calorific value sufficient for recycling to the burners of the reformer furnace in reforming step 3; an additional fuel supply is provided by the fuel NG, both for supplementing the energy supply from the residuals and for ensuring operational flexibility.

The CO conversion reaction (water-gas shift reaction) of step 4 is a catalytic equilibrium reaction. This reaction is exothermic, and conversion of the CO is favoured at low temperature. This reaction is conventionally carried out in an adiabatic fixed-bed catalytic reactor.

Depending on its composition, the synthesis gas exiting the conversion reactor is at a temperature which is higher than its entry temperature by at least 50° C. or even 150° C. or more; this increase in temperature owing to the conversion reaction which takes place within the reactor at the same time represents a conversion loss of the order of 10 to 15% relative to a putative isothermal operation. A reactor which maintains a more stable temperature—a cooled and ideally isothermal reactor—would allow an increase in the conversion and therefore a reduction in the consumption of process natural gas for a given level of hydrogen production. On the other hand, increasing the conversion in this reactor would lead to a reduction in the calorific value of the PSA residues of step 6 that are recycled as a secondary fuel, thereby necessitating compensation through an increase in the supply of fuel NG.

There is therefore a need for a process which, for a given level of ultimate production, allows a substantial reduction in the overall consumption of the source gaseous hydrocarbons (natural gas), in other words which makes it possible to reduce the consumption of fuel NG at the same time as reducing the consumption of process NG, so as to obtain ultimately a substantial reduction in the overall consumption of NG.

The use of isothermal or pseudo-isothermal reactors for carrying out exothermic catalytic reactions is known practice.

U.S. Pat. No. 7,981,271 B2, then, discloses a pseudo-isothermal radial reactor which is used especially for the synthesis of ammonia, and in which a plurality of exchangers in the form of rectangular plates are immersed in a catalyst bed; the stream of cold reactants acts as a heat transfer fluid, and the reactants, after preheating in the plurality of exchangers, traverse the catalyst bed radially.

US 2010/0176346 A1 for its part discloses an isothermal reactor comprising tubes inserted in a shell. The shell contains boiling water and the tubes are divided into two sections: in a first section, the gas exiting reforming is circulated, and is cooled by indirect exchange with the boiling water, whereas, in the second section, which is filled with catalyst, the water-gas shift reaction is performed. This second section is maintained at a quasi-constant temperature by indirect cooling with the boiling water, at least part of which is converted into steam.

US 2017/0021322 A1 discloses a pseudo-isothermal reactor for carrying out exothermic reactions such as methanation or the synthesis of methanol or formaldehyde. This reactor comprises two catalytic zones which allow two-step conversion of the reactants. These two catalytic zones are immersed in a single shell, in which they exchange heat indirectly with boiling water or any other fluid having a boiling point appropriate to the operating pressure of the chamber.

These various documents teach the use of the exothermic heat of a reaction either for preheating the reagents in the reaction (U.S. Pat. No. 7,981,271) or for generating steam (US 2010/0176346-US 2017/0021322).

However, by increasing the temperature of the reactants entering the reactor, the teaching of U.S. Pat. No. 7,981,271 B2 runs counter to the needs of the process to which the invention applies, that process requiring the cooling of the synthesis gas between steps 3 and 4; for their part, US 2017/0021322 A1 and US 2010/0176346 A1 use the heat of the water-gas conversion reaction to heat water and thereby generate steam.

The performance data of prior-art conversion reactors used for the water-gas shift reaction and integrated into the steam reforming process in accordance with the prior art are presented in [Table 1] later on below; the data show that:
the consumption of process NG decreases, but
the conjoint consumption of fuel NG increases,
the resulting overall hydrocarbon saving is limited, with environmental and economic disadvantages and also disadvantages in terms of return-on-investment period.

Accordingly, the solutions in the prior art do not provide a satisfactory solution to the problem addressed, which is that of reducing substantially the consumption of natural gas, both process NG and fuel NG, for a given final production level.

SUMMARY OF THE INVENTION

It is therefore an objective of the invention to reduce significantly the overall consumption of natural gas in the process, this objective being achieved by reducing both the consumption of process NG and the consumption of fuel NG, the first through the use of a cooled reactor for converting the CO, and the second by employing the heat, produced by the CO conversion reaction and recovered in the reactor during this cooling, as a heat supply in partial substitution for the fuel NG, for heating the reforming feedstock. The solution of the invention therefore allows a decrease in the overall consumption of natural gas by the plant, without any change in the final production level.

To achieve this, the invention provides a process for producing hydrogen from a light hydrocarbon source, comprising at least the following steps:

step (a): generating a synthesis gas by steam reforming from a source of said light hydrocarbons, this step itself comprising at least a step (a1) of desulfurizing said hydrocarbons for reforming, an optional step (a2) of pre-reforming the desulfurized hydrocarbons, a step (a3) of steam-reforming the desulfurized and optionally pre-reformed hydrocarbons in tubular reactors installed in the furnace of a reformer heated by burners which are fed with fuel by at least secondary fuel gas, comprising some or all of the residual gas mixture produced in the hydrogen production step (b) of the process, and primary fuel, withdrawn preferably from the light hydrocarbon source;

step (b): producing hydrogen from the synthesis gas generated in step (a), itself comprising at least a step (b1) of hydrogen-enriching the synthesis gas by conversion of carbon monoxide according to the exothermic conversion reaction $CO+H_2O \rightarrow CO_2+H_2$, and a step (b2) of purifying the synthesis gas in a pressure swing adsorption unit to give a pure $H_2$ product and a residual gas mixture containing $CH_4$, $CO$, $H_2$ and $CO_2$, characterized in that the conversion reaction of step (b1) is carried out in a cooled conversion reactor in which some of the heat produced in step (b1) is transferred by indirect heat exchange—within the reactor—with a first fluid thus preheated before it is used in the synthesis gas generation step (a), and in that the hydrogen-enriched synthesis gas leaving the conversion reactor is cooled by indirect heat exchange with a second fluid before it is used in step (a).

The process of the invention may feature one or more of the following variants:
with the synthesis gas entering the conversion reactor at a temperature $T_E$, the hydrogen-enriched synthesis gas leaves the convection reactor cooled to a temperature $T_S$ of less than $T_E+40°$ C., preferably less than $T_E+30°$ C., more preferably less than $T_E+10°$ C.;
the first gaseous fluid to preheat is the residual gas mixture feeding the burners of the reformer, and the second gaseous fluid to preheat is composed of the light hydrocarbons for reforming;
the first gaseous fluid to preheat is composed of the light hydrocarbons for reforming and the second gaseous fluid to preheat is the residual gas mixture feeding the burners of the reformer;
for a hydrogen production level and operating conditions which are otherwise similar, the total consumption of light hydrocarbons is decreased by at least 1%, preferably at least 2%, more preferably still at least 3% relative to a process employing an adiabatic conversion reactor; in other words, by providing a total amount of light hydrocarbons decreased by at least 1%, preferably at least 2%, more preferably still at least 3% to the hydrogen production process, and maintaining other process operating conditions similar, the hydrogen production level remains unchanged.

According to another subject of the invention, the invention provides a cooled conversion reactor for implementing any one of the processes as defined above, characterized in that it is equipped with means for admitting the first fluid to preheat before it is used in step (a), reactor-internal means for circulating said first fluid for preheating and for heat exchange with the synthesis gas for cooling, and means for exit of said preheated first fluid.

The reactor may feature one or more of the following variants:
- the cooled conversion reactor may be a plate-corrugated sheet reactor;
- the cooled conversion reactor may be a shell-and-tube reactor, and may be adapted for circulating synthesis gas in catalyst-filled tubes and for circulating said first fluid for preheating in the shell;
- the cooled conversion reactor may be a shell-and-tube reactor, and may be adapted for circulating synthesis gas in the catalyst-filled shell and for circulating said first fluid for preheating in the tubes.

According to yet another subject of the invention, the invention provides a plant suitable for implementing the process of the invention according to any one of the embodiments described above, characterized in that it is equipped with a cooled conversion reactor selected from those described above, and is equipped with means suitable for conveying said first fluid for preheating and for bringing it to the said reactor, and with means suitable for conveying said first preheated fluid from its exit from said conversion reactor to the location of its use at the reforming stage.

BRIEF DESCRIPTION OF THE DRAWINGS

Further features and advantages of the invention will become apparent from the description hereinafter of embodiments, which are given by way of illustration but without any limitation, the description being given in relation with the following attached figures.

DETAILED DESCRIPTION OF THE INVENTION

The comparative performance data of prior-art processes and processes according to the invention are presented in the tables referenced below.

[Table 1] presents comparisons of respective performance data of a process including an adiabatic reactor for the water-gas shift reaction and of a process including a cooled reactor for this same reaction according to the prior art, the conditions overall being otherwise comparable.

[Table 2] presents comparisons of respective performance data of a process including an adiabatic reactor for the water-gas shift reaction and of a first process according to the invention including a cooled reactor for this same reaction, the conditions overall being otherwise comparable.

[Table 3] presents comparisons of respective performance data of a process including an adiabatic reactor for the water-gas shift reaction and of a second process according to the invention including a cooled reactor for this same reaction, the conditions overall being otherwise comparable.

The selected hydrocarbon for reforming is natural gas (NG); other light hydrocarbon sources which may be reformed are suitable in the same way, alone or in combination, including for the purpose of providing the primary fuel. For the numbering of the elements and fluids in the figures, three-digit numbers are used: the hundreds digit corresponds to the reference of the figure, while the two other digits identify the element or fluid referenced.

Figure 1:
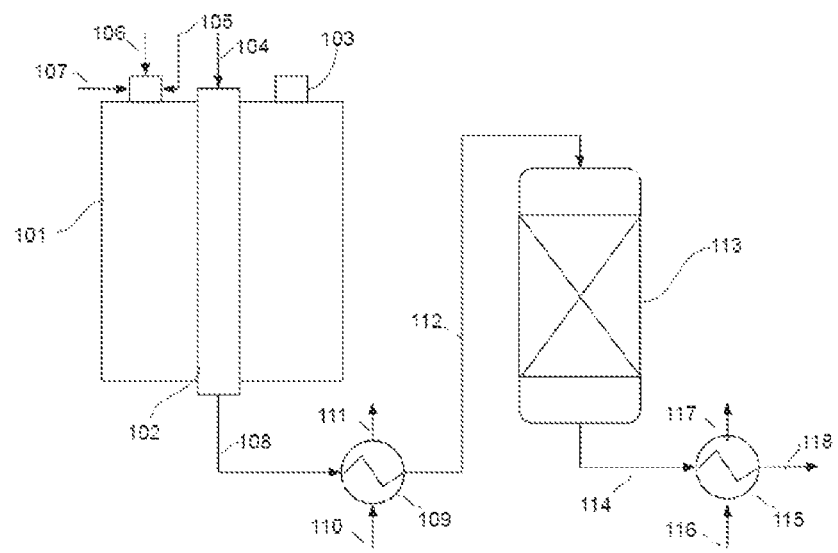
FIG. 1 represents a schematic view presenting a process for reforming natural gas for final production of hydrogen by PSA, comprising, conventionally, an adiabatic reactor for the water-gas shift reaction.

FIG. 1 represents the conventional integration of an adiabatic reactor for the water-gas shift reaction into the steam reforming process. A mixture 104 composed of process natural gas, which has been desulfurized and pre-reformed beforehand, and of water vapour feeds the reforming tubes 102 which are present in the reforming furnace 101, at a temperature of between 620° C. and 650° C.; in contact with a steam reforming catalyst which is present in the tubes, the hydrocarbons are converted and a synthesis gas 108 exits at the bottom end of the tubes, where it is collected. When it leaves the furnace, the synthesis gas is at a temperature of the order of 900° C. The burners 103 of the furnace, which are intended to supply the tubes with the heat required for reforming, are fed with combustion air 105, which is preheated, and with fuel natural gas 106 and the residues from the PSA unit 107, both of which are available at ambient temperature. The very hot synthesis gas 108 exiting reforming is cooled to a temperature of 360° C. by heat exchange in a boiler 109 with preheated water 110, thereby producing steam 111. At the boiler exit, cooled synthesis gas 112 enters the adiabatic conversion reactor 113 at 360° C., where it undergoes the water-gas shift reaction; some of the carbon monoxide present is converted catalytically therein—via the water vapour present—into carbon dioxide and hydrogen. The synthesis gas 114, enriched with $H_2$ and $CO_2$, leaves the conversion reactor 113 at a temperature higher than its entry temperature, of between 420° C. and 430° C., and subsequently gives up heat by passing through a shell-and-tube heat exchanger 115, where it preheats process natural gas 116 to a temperature of 360° C. The preheated process natural gas 117 feeds the desulfurization step of the process (that step not being shown).

Figure 2:
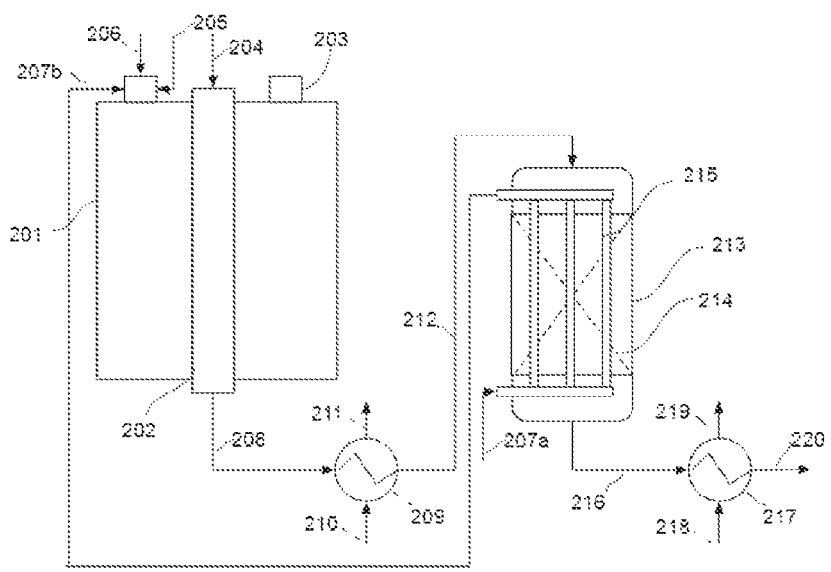
FIG. 2 is a schematic view presenting a first solution according to the invention, integrating a cooled reactor for the water-gas shift reaction with a process for reforming natural gas for final production of hydrogen by PSA, in which said reactor is cooled via a cold source of the process.

FIG. 2 represents a first solution for integration—according to the invention—of a cooled reactor for the water-gas shift reaction. According to this solution, a mixture 204 of process natural gas which has beforehand been desulfurized and pre-reformed, and of water vapour, feeds the tubes 202 of the reforming furnace 201 at a temperature of between 620° C. and 650° C.; on contact with a steam reforming catalyst present in the tubes, the hydrocarbons are converted and a synthesis gas 208 exits at the bottom end of the tubes, where it is collected. On leaving the furnace, the synthesis gas 208 is at a temperature of the order of 900° C., and is subsequently cooled to a temperature of 380° C. in a boiler 209 which is fed with preheated water 210, thereby producing steam 211. At the boiler exit, the cooled synthesis gas 212 enters the cooled reactor 213 for the water-gas shift reaction; some of the carbon monoxide present in the gas is converted in the presence of water vapour and in contact with the catalyst which is placed in a fixed bed 214 in the shell of the reactor 213, the conversion producing carbon dioxide and hydrogen. A bundle of tubes 215 placed within the catalyst bed allows the circulation of the residual PSA gases 207a—the hydrogen-purifying PSA unit is not shown—by circulating in the tubes 215, the gases 207a are preheated; the preheated gases 207b attain a temperature of 357° C. The synthesis gas 216, enriched with $H_2$ and $CO_2$, is simultaneously cooled and leaves the reactor at a temperature of 380° C., and then is used as a heat source in a shell-and-tube exchanger 217 for preheating the process natural gas 218 to a temperature of 360° C. The process natural gas thus preheated 219 feeds the desulfurization step of the process—the latter step not being shown.

The burners 203 of the reforming furnace 201 are fed with preheated combustion air 205, with natural gas at ambient temperature 206 and with the preheated residual gases from the PSA unit 207b.

Figure 3:
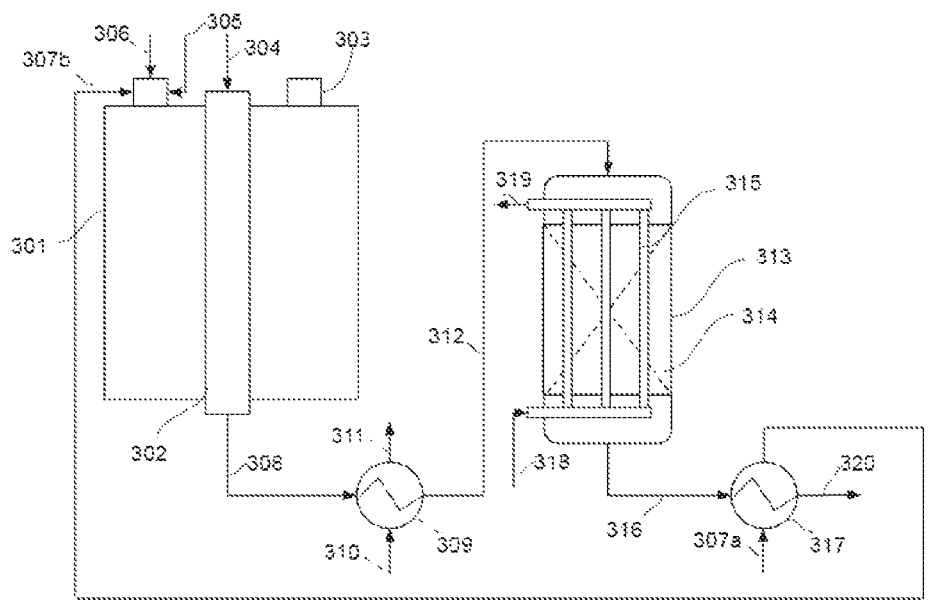
FIG. 3 is a schematic view presenting a second solution according to the invention, integrating a cooled reactor for the water-gas shift reaction with a process for reforming natural gas for eventual production of hydrogen by PSA, in which said reactor is cooled via a cold source of the process, different from the first solution.

FIG. 3 represents a second solution integrating, in accordance with the invention, a cooled reactor for the water-gas shift reaction into a process for production of synthesis gas by steam reforming of natural gas. According to this solution, a mixture 304 composed of process natural gas which has been desulfurized—and if necessary pre-reformed—beforehand, and of water vapour, enters the reforming tubes 302 of the steam reforming furnace 301. The gas mixture, which enters at a temperature of between 500° C. and 650° C., is contacted with a steam reforming catalyst which is present in the tubes, and the hydrocarbons are converted, the synthesis gas 308 being collected at the exit from the tubes; the gas 308 leaving the steam reforming furnace 301 is at a temperature of between 850° C. and 950° C. It is cooled to a temperature of between 250° C. and 400° C. in a boiler 309 which is fed with preheated water 310 and produces steam 311. The cooled synthesis gas 312 then enters the cooled reactor 313 for the water-gas shift reaction. Some of the carbon monoxide present is converted into carbon dioxide and hydrogen in contact with the catalyst placed in a fixed bed 314 in the shell. A bundle of tubes 315 is placed within the catalyst bed, and a cooling fluid circulates therein, this fluid being composed, according to this second solution example of the invention, of the process natural gas 318 which must be preheated before it enters the desulfurizing unit. The preheated natural gas 319 leaves the bundle of tubes 315 at a temperature of 360° C. and is sent to the desulfurizing unit (which is not shown).

After having given up some of its heat to the natural gas 318, the synthesis gas 316 exits the shift reactor 313 at a temperature of 380° C., and passes subsequently into a shell-and-tube heat exchanger 317, where it provides heat to the residual gas 307a from the PSA unit. The PSA residuals 307b thus preheated to a temperature of 360° C. are sent to the burners 303 of the steam reforming furnace 301. The burners 303 are also fed with combustion air 305, which may or may not have been preheated, and with fuel natural gas 306 at ambient temperature.

The conversion reactors according to the invention that are shown in FIG. 2 and FIG. 3 are shell-and-tube reactors, with the synthesis gas circulating in the shell containing the catalyst, and the gaseous fluid for reheating circulating in the tubes; it would have been possible to employ a shell-and-tube reactor with circulation of the synthesis gas in tubes containing catalyst and with circulation of the fluid for reheating in the shell. It would also have been possible to employ any other type of exchanger, especially a plate-corrugated sheet exchanger.

[Table 1] below represents a comparison of the respective performance data of a process including an adiabatic reactor for the water-gas shift reaction and of a process including an isothermal reactor for this same reaction, the following conditions being otherwise comparable:

the hydrogen production level is the same for both configurations (5800 kmol/h);

the synthesis gas entering the conversion reactor has the same composition in both cases: 49.3% $H_2$, 10.2% CO, 5.2% $CO_2$, 32.2% $H_2O$, 0.3% $N_2$, 2.8% $CH_4$;

in the first configuration, the synthesis gas enters the adiabatic reactor (A) at a temperature of 360° C.; the exit temperature is then 428° C.;

in the second configuration, the isothermal reactor (I) is itself operated at a temperature of 380° C.

TABLE 1

|  | Adiabatic reactor A | Isothermal reactor I | Variation (I-A)/A |
| --- | --- | --- | --- |
| Consumption of process NG (kmol/h) | 1972 | 1929 | −2.2% |
| Consumption of fuel NG (kmol/h) | 296 | 327 | +10.6% |
| Consumption of total NG (kmol/h) | 2268 | 2257 | −0.5% |

The performance data reported for the isothermal reactor are the result of a simulation carried out on the basis of a shell-and-tube reactor employing boiling water as cooling fluid. The comparison of the respective performance data of a process including an adiabatic reactor for the water-gas shift reaction and of a process including an isothermal reactor (cooled, with identical entry and exit temperatures of the natural gas) for this same reaction shows that:

with regard to the process NG: the isothermal reactor offers better conversion, allowing a reduction of 2.2% in the amount of process NG required to produce the 5800 kmol/h of hydrogen;

with regard to the fuel NG: the PSA residuals (step 6) which are used as secondary fuel are nevertheless less CO-rich than in the case of the adiabatic reactor, and there will therefore be a lower calorific supply, which will have to be compensated otherwise, hence the increase in the consumption of fuel NG by 10.6%;

with regard to the total NG: the result is an overall saving of 0.5% in the total consumption of natural gas in a process employing an isothermal reactor according to the prior art, relative to the standard process employing an adiabatic reactor.

[Table 2] represents the comparative performance data of the process of the invention shown in FIG. 2, obtained by simulation, and of the same, conventional process employing an adiabatic shift reactor as in [Table 1]. In both cases, the hydrogen production rate is the same, at 5800 kmol/h of hydrogen, and the synthesis gas composition entering the reactor is the same: 49.3% $H_2$, 10.2% CO, 5.2% $CO_2$, 32.2% $H_2O$, 0.3% $N_2$, and 2.8% $CH_4$.

TABLE 2

|  | Adiabatic reactor A | Isothermal reactor I | Variation (I-A)/A |
| --- | --- | --- | --- |
| Entry temp. $T_E$ ° C. | 360 | 380 |  |
| Exit temp. $T_S$ ° C. | 428 | 380 |  |
| CO content at reactor exit | 3.33 | 2.29 |  |
| Temp. of PSA residuals ° C. | 35 | 357 |  |

TABLE 2-continued

|  | Adiabatic reactor A | Isothermal reactor I | Variation (I-A)/A |
|---|---|---|---|
| Consumption of process NG | 1972 | 1932 | −2.0% |
| Consumption of fuel NG | 296 | 261 | −11.8% |
| Total consumption of NG | 2268 | 2193 | −3.3% |
| Thermal yield of SMR furnace (%) | 49.8 | 51.3 |  |
| Production of excess steam (t/h) | 73 | 60 | −18.0% |
| $CO_2$ emitted (kmol/h) | 2479 | 2394 | −3.4% |

The data presented show that:
the PSA residuals, initially at the temperature of 35° C., are preheated in the conversion reactor to a temperature of 357° C., and exchange their heat with the synthesis gas, which enters at the temperature of 380° C. and leaves at the same temperature despite the exothermic heat of the conversion reaction; the amount of heat which needs to be supplied to the reforming by the fuel NG is less, and its consumption is therefore reduced;
the preheating of the PSA residuals gives rise to an increase in the thermal yield of the reforming furnace (51.3% instead of 49.8%, or an increase of 1.5%), thereby reducing further the amount of heat which has to be supplied and the consumption of fuel NG;
the synthesis gas exiting the conversion reactor is at a temperature very much lower than that of the synthesis gas exiting the adiabatic conversion reactor of the conventional process (380° C. rather than 428° C., or approximately 50° C. lower), thereby providing evidence of the stabilization of the temperature in the conversion reactor, which allows an improvement in the yield of the conversion reaction; consequently, the process NG flow rate required for the same level of hydrogen production is reduced.

[Table 3] shows the comparative performance data of the process of the invention according to FIG. 3, as obtained by simulation, and of the same, conventional process using an adiabatic shift reactor as in [Table 1]. In both cases, the hydrogen production rate of 5800 kmol/h of hydrogen is the same, and the synthesis gas composition entering the reactor is the same: 49.3% $H_2$, 10.2% CO, 5.2% $CO_2$, 32.2% $H_2O$, 0.3% $N_2$, 2.8% $CH_4$.

TABLE 3

|  | Adiabatic reactor A | Isothermal reactor I | Variation (I-A)/A |
|---|---|---|---|
| Entry temp. $T_E$ (° C.) | 360 | 370 |  |
| Exit temp. $T_S$ (° C.) | 428 | 380 |  |
| CO content at exit from reactor | 3.33 | 2.28 |  |
| Temp. of PSA residuals (° C.) | 35 | 360 |  |
| Consumption of process NG | 1972 | 1933 | −2.0% |
| Consumption of fuel NG | 296 | 261 | −11.8% |
| Total consumption of NG | 2268 | 2194 | −3.3% |
| Thermal yield of SMR furnace (%) | 49.8 | 51.3 |  |
| Production of excess steam (t/h) | 73 | 60 | −18.0% |
| CO2 emitted (kmol/h) | 2479 | 2395 | −3.4% |

The data presented show that:
the PSA residuals, initially at a temperature of 35° C., are preheated to a temperature of 360° C. by exchange of heat with the synthesis gas having left the conversion reactor at a temperature of 380° C.;
preheating of the PSA residuals produces an increase in the thermal yield of the reforming furnace (51.3% instead of 49.8%, or an increase of 1.5%), thereby further reducing the amount of heat needing to be supplied and the consumption of fuel NG;
the synthesis gas exiting the conversion reactor is at a temperature very much lower than that of the synthesis gas exiting the adiabatic conversion reactor of the conventional process (380° C. rather than 428° C., or approximately 50° C. lower), thereby providing evidence of the stabilization of the temperature in the conversion reactor, which allows an improvement in the yield of the conversion reaction; consequently, the flow rate of process NG required for the same level of hydrogen production is reduced.

In light of these tables, it is noted that the two configurations according to the invention both feature comparable advantages:
reduction in the consumption both of process NG and of fuel NG; for a given level of production, the consumption of process NG is reduced by virtue of improved conversion in the cooled reactor for the water-gas shift reaction, while the consumption of fuel NG is reduced by virtue of a judicious selection of the cooling fluid used for removing the heat produced by the conversion reaction outside the conversion reactor;
because the latter is linked to the preheating of the PSA residuals, it gives rise to an increase in the thermal yield of the reforming furnace, thereby further reducing the amount of heat which has to be supplied and the consumption of fuel NG; this therefore signifies a greater reduction in the overall consumption of natural gas, compared with the known solutions.

The two solutions proposed by the invention are advantageous:
firstly in terms of improved operation of the reforming, as shown by Tables 2 and 3, with a decrease in the consumption of hydrocarbons and an improvement in the thermal yield of the reforming furnace;
secondly because the shift reactor operates at a lower temperature, therefore the sintering of the catalyst will be reduced, hence increasing its lifetime.

Other criteria will allow one or other of the solutions to be preferred, according to the case in hand.

The solution employing the PSA residuals as the heat transfer fluid in the reactor is more favourable in the context of updating an existing unit, since it involves fewer modifications to the existing system:
the piping of the natural gas preheating system is unchanged;
the exchanger for preheating natural gas may stay the same or might require the addition of a number of tubes, depending on its dimensions;

the mechanical integration of the unit is subject to few modifications apart from for the conduits transporting the PSA residuals.

The solution employing natural gas as the heat transfer fluid in the reactor will be preferred in the context of the construction of a new unit, since the operation of the unit will be made easier, the reasons being as follows:

the start-up sequence is simplified: in this solution, the heat transfer fluid is available at start-up, whereas the PSA residuals (heat transfer fluid in the solution of FIG. 2) are not (the entire chain upstream of the PSA must first be started up, including the conversion reactor). This means that this solution allows direct start-up of the conversion reactor in cooled mode;

for the same reason, in the event of complete or partial failure of the PSA, there will be no impact on the operation of the conversion reactor, by contrast with the solution employing the PSA residuals for cooling thereof.

The invention therefore presents many advantages relative to the prior art and to the practice of the skilled person, among those already cited:

a reactor which maintains a more stable temperature—a cooled and ideally isothermal reactor—allows an increase in conversion and hence a reduction in the consumption of process natural gas for a given level of hydrogen production;

the use of the heat produced by the conversion for heating fluids feeding the reforming significantly decreases the total consumption of hydrocarbons;

the judicious use/removal of the heat from the reactor via the preheating of the residues from the PSA unit allows first some of the energy required for the reforming to be supplied and second the thermal yield of the steam reforming furnace to be increased.

This invention also leads to improvements in terms of the plant considered within its environment, including the following:

since the consumption of natural gas goes down, the $CO_2$ emissions will be decreased;

the thermal yield of the furnace increases, and the heat is used more effectively internally, and so the production of excess steam will be reduced.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for producing hydrogen from a light hydrocarbon source, comprising at least:
    (a) generating a synthesis gas by steam reforming of said light gaseous hydrocarbons, comprising at least a step (a1) of desulfurizing said hydrocarbons for reforming, a step of steam-reforming the desulfurized hydrocarbons in tubular reactors installed in a furnace of a reformer heated by burners which are fed with fuel by at least a secondary fuel gas,
    (b) producing hydrogen from the synthesis gas generated in step (a), comprising at least a step (b1) of hydrogen-enriching the synthesis gas by conversion of carbon monoxide according to the exothermic conversion reaction $CO+H_2O \rightarrow CO_2+H_2$ and a step (b2) of purifying the synthesis gas in a pressure swing adsorption unit to give a pure $H_2$ product and a residual gas mixture containing $CH_4$, $CO$, $H_2$ and $CO_2$,
    wherein the secondary fuel gas is comprised of at least some of the residual gas mixture produced in the hydrogen production step (b) and a primary fuel gas,
    wherein the conversion reaction of step (b1) is carried out in a cooled conversion reactor in which some of the heat produced in step (b1) is transferred by indirect heat exchange in the cooled conversion reactor with a first gaseous fluid so as to preheat the first gaseous fluid before the first gas fluid is used in the synthesis gas generation step (a), and in that the hydrogen-enriched synthesis gas leaving the cooled conversion reactor is cooled by indirect heat exchange with a second gaseous fluid before the second gaseous fluid is used in step (a),
    wherein the first gaseous fluid for preheating is selected from the group consisting of the residual gas mixture feeding the burners of the reformer and the light hydrocarbons for reforming,
    wherein the second gaseous fluid for preheating is selected from the group consisting of the residual gas mixture feeding the burners of the reformer and the light hydrocarbons for reforming,
    wherein the first gaseous fluid and the second gaseous fluid are different fluids.

2. The process according to claim 1, wherein the synthesis gas enters the conversion reactor at a temperature $T_E$, the hydrogen-enriched synthesis gas leaves the reactor cooled to a temperature $T_S$ of less than $T_E+40°$ C.

3. The process according to claim 1, wherein the first gaseous fluid for preheating is the residual gas mixture feeding the burners of the reformer, and the second gaseous fluid for preheating is composed of the light hydrocarbons for reforming.

4. The process according to claim 1, wherein the first gaseous fluid for preheating is composed of the light hydrocarbons for reforming and the second gaseous fluid for preheating is the residual gas mixture feeding the burners of the reformer.

5. The process according to claim 1, wherein for a hydrogen production level and operating conditions which are otherwise similar, the total consumption of light hydrocarbons is decreased by at least 1% relative to a process employing an adiabatic conversion reactor.

6. The process according to claim 1, wherein the synthesis gas enters the conversion reactor at a temperature $T_E$, the hydrogen-enriched synthesis gas leaves the reactor cooled to a temperature $T_S$ of less than $T_E+30°$ C.

7. The process according to claim 1, wherein the synthesis gas enters the conversion reactor at a temperature $T_E$, the hydrogen-enriched synthesis gas leaves the reactor cooled to a temperature $T_S$ of less than $T_E+10°$ C.

8. The process according to claim 1, wherein for a hydrogen production level and operating conditions which are otherwise similar, the total consumption of light hydrocarbons is decreased by at least 2%.

9. The process according to claim 1, wherein for a hydrogen production level and operating conditions which are otherwise similar, the total consumption of light hydrocarbons is decreased by at least 3%.

10. The process according to claim 1, wherein the cooled conversion reactor is a plate-corrugated sheet reactor.

11. The process according to claim 1, wherein the cooled conversion reactor is a shell-and-tube reactor and is adapted for circulating the synthesis gas in catalyst-filled tubes and for circulating said first fluid for preheating in the shell.

12. The process according to claim 1, wherein the cooled conversion reactor is a shell-and-tube reactor and is adapted for circulating the synthesis gas in the catalyst-filled shell and for circulating said first fluid for preheating in the tubes.

* * * * *